United States Patent Office 3,235,721
Patented Feb. 15, 1966

3,235,721
AUTOMOTIVE LAMPS WITH SHOCK ISOLATION
LAMP SOCKET MOUNTINGS
John B. Dickson, Kew Gardens, N.Y., assignor to Lehigh Valley Industries, Inc., New York, N.Y., a corporation of Delaware
Original application Mar. 16, 1961, Ser. No. 96,181, now Patent No. 3,145,933, dated Aug. 25, 1964. Divided and this application Dec. 27, 1963, Ser. No. 333,932
5 Claims. (Cl. 240—8.2)

This application is a division of my co-pending application, Serial No. 96,181, filed March 16, 1961, now Patent No. 3,145,933. This invention relates to clearance and marker lamps for commercial automotive vehicles, such as buses and trucks, and more particularly to lamps of this type incorporating novel shock isolating means for the lamp bulb and its socket and novel means whereby lenses may be readily removed for access to the lamp bulb or bulbs..

Commercial automotive vehicles, such as buses, trucks, trailers and the like, are required by law or by Interstate Commerce Commission regulations, to carry or be provided with certain specified lamps of the clearance or marker type. Such lamps are designed to be mounted on the front and rear ends of the vehicle, and also on the sides of the vehicle.

As hitherto constructed, such lamps have had certain disadvantageous features. For example, due to the road shocks to which a commercial vehicle is continuously subjected, the filaments in the lamp bulbs have been broken at a relatively high rate. This necessitates that the lamp bulbs be replaced at frequent intervals, and very often this happens when the vehicle is on a run. Unless the driver has been supplied with certain special tools for removing lenses and the like, it is difficult, if not impossible, for him to replace a broken lamp bulb during a run.

In accordance with the present invention, novel lamp constructions are provided in which not only may the lenses be relatively easily removed for access to a lamp bulb or lamp bulbs, in the lamp housing, but also novel shock absorbing means are interposed between each lamp bulb socket and a relatively fixed part of the housing so that the lamp bulb and its socket are isolated from road shocks received by the vehicle. Consequently, the life of the lamp bulbs in lamps embodying the principles of the present invention is an indefinite multiple of the life of lamp bulbs in known types of marker and clearance lamps.

Stated as a general principle, the shock isolating mounts of the lamps of the present invention operate in a cantilever fashion. They are formed of relatively soft rubber elements, which have somewhat the configuration of nipples, with the base of the nipple being secured to the housing of the lamp and the support for the lamp bulb sockets being mounted on the upper ends of the nipples and spaced substantially from the base thereof. Due to the relatively soft nature of the rubber or rubber-like material used in making the shock mountings, this material has a resiliency and "give" which allows shocks to be absorbed without being transmitted to the lamp socket or the lamp therein.

For an understanding of the principles of the invention, reference is made to the following description of typical embodiments thereof as illustrated in the accompanying drawings. In the drawings:

FIG. 1 is a plan view of a marker or clearance lamp embodying the invention, the lens being removed;

FIGS. 2 and 3 are sectional views taken on the lines 2—2 and 3—3, respectively, of FIG. 1;

Figure 1:
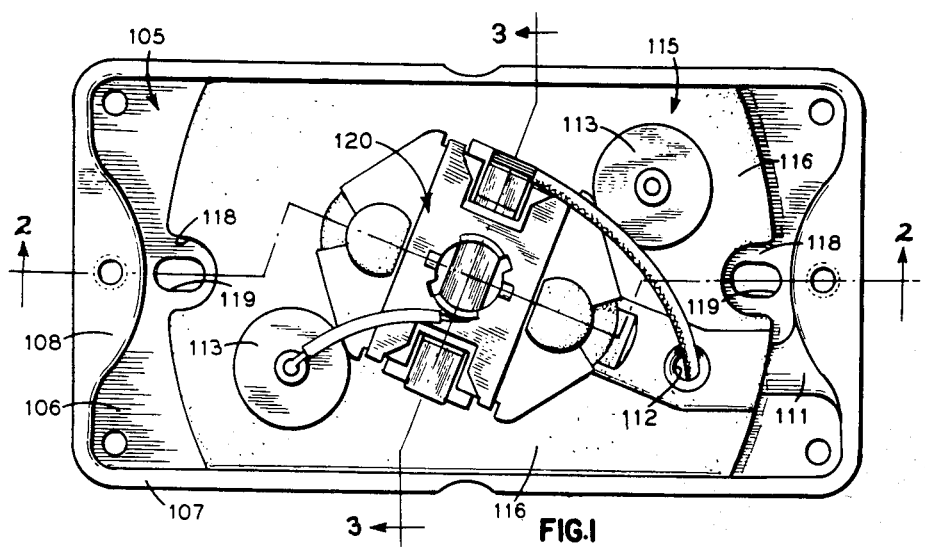

Referring to FIGS. 1 through 6, the lamp therein illustrated includes a metal base 105 which is relatively shallow, having a flat bottom wall 106 and a peripheral rim 107 which is widened arcuately at each end of the base. The arcuate portions 108 have threaded apertures which are axially lengthened to receive fastening screws for a retainer 109 for the lens 110. Bottom wall 106 of base 105 has an inwardly offset dog-leg groove 111 opening outwardly through the rim 107 and having an aperture at its end aligned with an aperture 112 in the base 116 of a shock isolating mounting 115.

Figure 2:
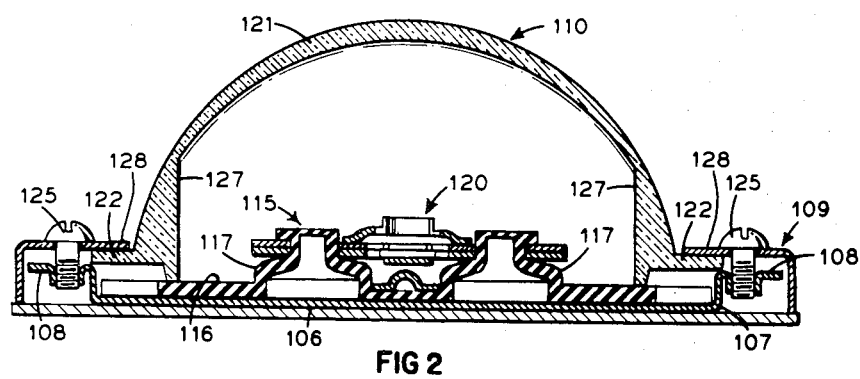
Figure 3:
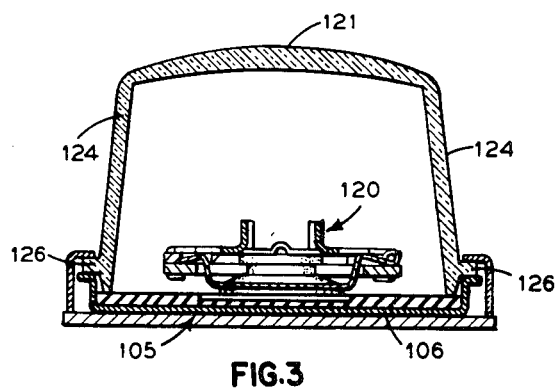
Figure 4:
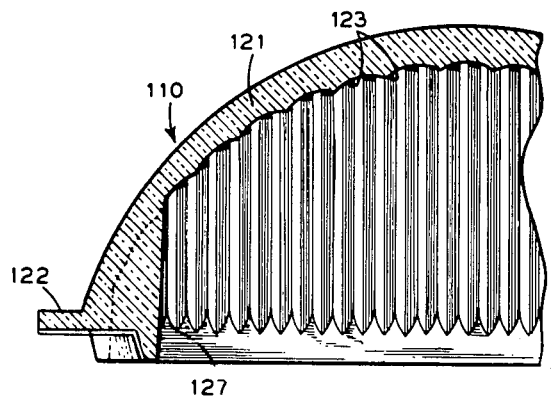
FIG. 4 is an enlarged partial longitudinal sectional view of the lens of the lamp shown in FIG. 1, illustrating details of its construction.
Figure 5:
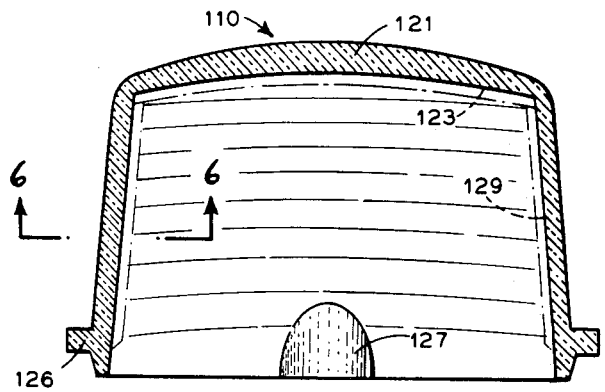
FIG. 5 is a transverse sectional view through the lens.
Figure 6:
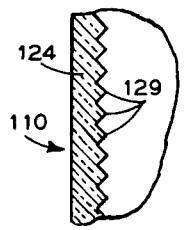
FIG. 6 is a detailed partial sectional view of the lens illustrating a further detail of its construction.

The shock mount 115 is essentially similar to the shock mount 35 of FIGS. 1, 2 and 3 of my said copending application, except that its upwardly projecting nipples or bosses 117 are much shallower. The base 116 of the shock mount is essentially rectangular in plan having arcuate ends, and is secured to the bottom wall 106 of metal base 105 by means of washer-type rivets 113.

The socket assembly, indicated at 120, is identical with the socket assembly of FIGS. 1, 2 and 3 of my said co-pending application, so that further description thereof is not believed necessary.

Each end of base 116 has a recess 118 aligned with an oval opening 119 in the bottom wall 106 of metal base 105. Lens 110, which is molded of a suitable transparent or translucent plastic composition material has a substantially cylindrical outer wall 121 the lower ends of which terminate in flanges 122. Wall 121 is cylindrical about an axis extending transversely of the lamp, and its inner surface is formed with a plurality of transversely extending arcuate grooves 123. Side walls 124 slope downwardly and inwardly from the outer wall 121, and are formed with horizontal ledges 126, the side walls extending below this ledge. Adjacent either end of top wall 121, the latter is thickened so that its inner surface is substantially vertical, as indicated at 127, and this portion of the top wall extends below the ledges 122 to terminate in a common plane with the lower edges of side walls 124.

When lens 110 is placed on the lamp base, the lower edges of its side and end walls engage the flat base 116 of the shock mount 120, which latter is made of soft rubber and thus also acts as a sealing gasket. The lens retainer 109 is then placed in position, and is an annular member having a central opening closely embracing the lens 110. This annular opening is bounded by an inwardly extending flange which overlies the ledges 122 and 126. Retainer 109 is secured in position by screws 125 extended through apertures in its flange 128 and threaded into the apertures in flanges 108. The side walls 124 of the lens are formed with vertically extending closely spaced triangular ribs 129.

It will be noted that, in this lamp, the socket assembly 120 is resiliently supported by the shock isolating assembly 115 so that no road shocks are transmitted to a lamp bulb mounted in the socket assembly. Also, the lens 110 can be easily removed by simply drawing out the screws 125, taking off the retainer 109, and then removing the lens 110.

While a specific embodiment of the invention has been shown and described in detail to illustrate the application of the principles of the invention, it will be understood that the invention may be embodied otherwise without departing from such principles.

What is claimed is:

1. An automotive vehicle lamp comprising, in combination, a housing including a relatively elongated base having a substantially flat surface portion bounded by an upstanding rim having an outwardly projecting peripheral flange; a shock isolating mounting of relatively soft and flexible rubber-like material including a relatively flat base portion extending laterally over and engaging said base surface portion, and hollow means extending upwardly from said base portion and formed with supporting formations for resiliently supporting a lamp socket assembly; a lamp socket assembly including a plate portion supported on said hollow supporting means and isolated thereby from shocks received by said base; a relatively elongated lens having a hollow upwardly extending housing portion within the peripheral flange of said base, and a rim seated on said base portion of said shock isolating mounting; said lens having a laterally extending peripheral flange above said rim and projecting outwardly over he peripheral flange of the rim of the base; a relatively elongated retaining element including a vertical peripheral wall arranged to engage the housing base and an inwardly extending horizontal wall formed with an opening receiving the housing portion of said lens and extending inwardly over the peripheral flange of the base rim; said retaining member being secured to said outwardly extending peripheral flange of said base to retain said lens with its rim compressing said base portion of said shock isolating mounting; said shock isolating mounting acting as a sealing gasket for said lens.

2. An automotive vehicle lamp as claimed in claim 1, in which said lens housing portion is longitudinally arched and has ribs extending laterally of the inner surface of the arched portion.

3. An automotive vehicle lamp as claimed in claim 2, in which said lens has a pair of side walls extending between its rim and the arched portion and formed with ribs extending laterally of said side walls on the inner surface thereof.

4. An automotive vehicle lamp comprising, in combination, a housing including a relatively elongated base having a substantially flat surface portion bounded by an upstanding rim; a shock isolating mounting of relatively soft and flexible rubber-like material including a relatively flat base portion extending laterally over and engaging said base surface portion, and hollow means extending upwardly from said base portion and formed with supporting formations for resiliently supporting a lamp socket assembly; a lamp socket assembly including a plate portion supported on said hollow supporting means and isolated thereby from shocks received by said base; a relatively elongated lens having a hollow upwardly extending housing portion within the upstanding rim of said base, and a rim seated on said base portion of said shock isolating mounting; said lens having a laterally extending peripheral flange above said rim of the base and projecting outwardly over said rim; a relatively elongated retaining element including a vertical peripheral wall arranged to surround the housing base and an inwardly extending horizontal wall formed with an opening receiving the housing portion of said lens and extending inwardly over said base upstanding rim; said retaining member being secured to said housing base to retain said lens with its rim compressing said base portion of said shock isolating mounting acting as a sealing gasket for said lens.

5. An automotive vehicle lamp comprising, in combination, a housing including a relatively elongated base having a substantially flat surface portion bounded by an upstanding rim; a shock isolating mounting of relatively soft and flexible rubber-like material including a relatively flat base portion extending laterally over and engaging said base surface portion, a pair of spaced hollow nipples projecting upwardly from said base portion, each of said nipples having an upper portion of lesser diameter terminating in a solid outwardly projection flange portion; a lamp socket assembly including a plate portion having receiving apertures adapted to engage said nipples at the portion of lesser diameter, whereby said lamp socket assembly is supported by said shock isolating mounting and isolated thereby from shocks received by said base; a relatively elongated lens having a hollow upwardly extending housing portion within the upstanding rim of said base, and a rim seated on said base portion of said shock isolating mounting; said lamp having a laterally extending peripheral flange above said rim of the base and projecting outwardly over said rim; a relatively elongated retaining element including a vertical peripheral wall arranged to surround the housing base and an inwardly extending horizontal wall formed with an opening receiving the housing portion of said lens and extending inwardly over said base upstanding rim; said retaining member being secured to said housing base to retain said lens with its rim compressing said base portion of said shock isolating mounting; said shock isolating mounting acting as a sealing gasket for said lens.

References Cited by the Examiner

UNITED STATES PATENTS

| 2,232,276 | 2/1941 | Schepmoes. | |
| 2,542,114 | 2/1951 | Bridge | 240—106.1 |
| 2,685,639 | 8/1954 | Wiley | 240—8.3 |
| 2,782,298 | 2/1957 | Scholz et al. | 240—90 |
| 3,032,646 | 5/1962 | Chieger | 240—8.2 |

NORTON ANSHER, *Primary Examiner.*

EVON C. BLUNK, *Examiner.*